(12) United States Patent
Parla et al.

(10) Patent No.: US 12,413,650 B2
(45) Date of Patent: *Sep. 9, 2025

(54) ROUTING APPLICATION CONTROL AND DATA-PLANE TRAFFIC IN SUPPORT OF CLOUD-NATIVE APPLICATIONS

(71) Applicant: Cisco Technology, Inc., San Jose, CA (US)

(72) Inventors: Vincent Parla, North Hampton, NH (US); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,513

(22) Filed: May 21, 2024

(65) Prior Publication Data

US 2024/0314219 A1    Sep. 19, 2024

Related U.S. Application Data

(63) Continuation of application No. 18/198,124, filed on May 16, 2023, now Pat. No. 12,052,329, which is a
(Continued)

(51) Int. Cl.
*H04L 67/63*     (2022.01)
*H04L 45/74*     (2022.01)
(Continued)

(52) U.S. Cl.
CPC ............. *H04L 67/63* (2022.05); *H04L 45/74* (2013.01); *H04L 47/2475* (2013.01); *H04L 67/1001* (2022.05)

(58) Field of Classification Search
CPC ...... H04L 67/63; H04L 45/74; H04L 47/2475
See application file for complete search history.

(56) References Cited

U.S. PATENT DOCUMENTS 8,787,250 B2 *   7/2014   Beser ................. H04W 40/00
                                                  370/328
9,419,942 B1 *   8/2016   Buruganahalli ........ H04L 63/20
(Continued)

OTHER PUBLICATIONS

Kong Gateway, "Hybrid Mode Deployment," downloaded Jun. 7, 2021, 11 pages.
(Continued)

*Primary Examiner* — David R Lazaro
(74) *Attorney, Agent, or Firm* — Lee & Hayes, P.C.

(57) ABSTRACT

Techniques for using computer networking protocol extensions to route control-plane traffic and data-plane traffic associated with a common application are described herein. For instance, a traffic flow associated with an application may be established such that control-plane traffic is sent to a control-plane node associated with the application and data-plane traffic is sent to a data-plane node associated with the application. When a client device sends an authentication request to connect to the application, the control-plane node may send an indication of a hostname to be used by the client device to send data-plane traffic to the data-node. As such, when a packet including the hostname corresponding with the data-plane node is received, the packet may be forwarded to the data-plane node.

20 Claims, 7 Drawing Sheets

Related U.S. Application Data continuation of application No. 17/376,646, filed on Jul. 15, 2021, now Pat. No. 11,689,642.

(51) Int. Cl.
   *H04L 47/2475* (2022.01)
   *H04L 67/1001* (2022.01)

(56) References Cited

U.S. PATENT DOCUMENTS

| | | | | |
|---|---|---|---|---|
| 10,148,430 | B1* | 12/2018 | Roth | H04L 9/0819 |
| 10,454,823 | B1* | 10/2019 | Thomas | H04L 45/74 |
| 11,362,862 | B2* | 6/2022 | Liebsch | H04L 47/122 |
| 11,689,642 | B2* | 6/2023 | Parla | H04L 67/1001 |
| | | | | 370/392 |
| 12,052,329 | B2* | 7/2024 | Parla | H04L 63/0281 |
| 2016/0352867 | A1* | 12/2016 | Subbarayan | H04L 63/08 |
| 2020/0104275 | A1* | 4/2020 | Sen | G06F 9/544 |
| 2020/0162422 | A1* | 5/2020 | Meng | H04L 61/2582 |
| 2020/0169394 | A1 | 5/2020 | Khristi et al. | |
| 2020/0245163 | A1 | 7/2020 | Jaya et al. | |
| 2020/0336467 | A1 | 10/2020 | Subbarayan et al. | |
| 2020/0409611 | A1 | 12/2020 | Olson et al. | |
| 2020/0412667 | A1* | 12/2020 | Elder | H04L 49/309 |
| 2021/0067561 | A1 | 3/2021 | Ithal et al. | |
| 2021/0168052 | A1* | 6/2021 | Parulkar | H04L 12/66 |
| 2023/0015687 | A1* | 1/2023 | Parla | H04L 47/2475 |
| 2023/0291813 | A1* | 9/2023 | Parla | H04L 67/1001 |
| 2024/0314219 | A1* | 9/2024 | Parla | H04L 47/2483 |

OTHER PUBLICATIONS

Office Action for U.S. Appl. No. 18/198,124, mailed on Dec. 6, 2023, Vincent E. Parla, "Routing Application Control and Data-Plane Traffic in Support of Cloud-Native Applications", 6 pages.

Office Action for U.S. Appl. No. 17/376,646, mailed on Oct. 5, 2022, Parla, "Routing Application Control and Data-Plane Traffic in Support of Cloud-Native Applications", 6 pages.

The PCT Search Report and Written Opinion mailed Sep. 27, 2022 for PCT application No. PCT/US2022/036255, 16 pages.

Rescoria: "TLS Encrypted Client Hello draft-ietf-tls-esni-09'", TLS Internet-Draft, Dec. 16, 2020 (Dec. 16, 2020), XP055808812, Retrieved from the Internet: URL:https://tools.ietf.org/pdf/draft-ietftls-esni-09.pdf [retrieved on May 28, 2021] section I "Introduction".

* cited by examiner

ROUTING APPLICATION CONTROL AND DATA-PLANE TRAFFIC IN SUPPORT OF CLOUD-NATIVE APPLICATIONS

CROSS-REFERENCE TO RELATED APPLICATION

This patent application is a continuation of and claims priority to U.S. patent application Ser. No. 17/376,646, filed Jul. 15, 2021, and U.S. patent application Ser. No. 18/198,124, filed May 16, 2023, which is fully incorporated herein by reference.

TECHNICAL FIELD

The present disclosure relates generally to techniques for using computer-networking protocol extensions as a mechanism for routing control-plane traffic and data-plane traffic associated with a common application.

BACKGROUND

In general, secure access solutions and cloud-native applications use a common control-plane and data-plane mechanism for application authentication and application data. The techniques used in these solutions/applications typically rely on the fact that all of the traffic leverages the same destination for both the control-plane and the data-plane. While this works well in an appliance scenario, the approach of mixing control-plane and data-plane traffic in a cloud-native architecture is less desirable, and it may be desirable in a cloud-native architecture to scale control-plane and data-plane components separately.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes systems and methods for using computer-networking protocol extensions as a mechanism for routing control-plane traffic and data-plane traffic associated with a common application (e.g., a cloud-native application). By way of example, and not limitation, a method according to the various techniques described in this disclosure may include establishing a traffic flow associated with an application such that control-plane traffic of the traffic flow is sent to a control-plane node associated with the application and data-plane traffic of the traffic flow is sent to a data-plane node associated with the application. The method may also include receiving a first packet from a client device, the first packet including a first hostname that is associated with the application. Based at least in part on the first packet including the first hostname, the first packet may be sent to the control-plane node associated with the application. The method may also include receiving a second packet from the client device, the second packet including a second hostname that corresponds with the data-plane node associated with the application. Based at least in part on the second packet including the second hostname, the second packet may be sent to the data-plane node associated with the application.

Additionally, the techniques described herein may be performed as a method and/or by a system having non-transitory computer-readable media storing computer-executable instructions that, when executed by one or more processors, performs the techniques described herein.

EXAMPLE EMBODIMENTS

As discussed above, secure access solutions use a common control-plane and data-plane mechanism for application authentication and application data. The techniques used in these secure access solutions typically rely on the fact that all of the traffic leverages the same destination for both the control-plane and the data-plane. While this works well in an appliance scenario, the approach of mixing control-plane and data-plane traffic in a cloud-native architecture is less desirable, and it may be desirable in a cloud-native architecture to scale control-plane and data-plane components separately.

Accordingly, described herein are techniques for using computer-networking protocol extensions (e.g., server name indication (SNI), encrypted client hello (ECH), etc.) as a mechanism for routing control-plane traffic and data-plane traffic associated with a common application (e.g., cloud-native applications, secure access solutions, such as TLS-based ZTNA (zero trust network access), RA VPN (remote access virtual private network), and the like) to segregated control-plane and data-plane components/devices. For instance, a proxy server (e.g., protocol load balancer) of a content delivery network (CDN) may load balance control-plane traffic and data-plane traffic to control-plane nodes and data-plane nodes, respectively, based on, for instance, a hostname included in an SNI field or ECH field of a header of a packet. In some examples, when a client device sends a request to connect to an application, the client device may include the generic hostname corresponding to the application. The proxy server may recognize this connection request as a control-plane authentication request and forward the request to a control-plane node associated with the application. The control-plane node may then authenticate the client device or a user of the client device to connect to the application, and the control-plane node may reply to the client device with a new hostname corresponding with a data-plane node associated with the application, and the client device may use the new hostname to send data-plane requests/traffic to the application. When a data-plane packet comes into the CDN, the proxy server may then use the new hostname to direct the packet to the data-plane node.

In some examples, using protocol extensions (e.g., SNI or ECH) to split out control-plane and data-plane components can be used for virtual private network (VPN) connections, ZTNA solutions, cloud-native applications, and/or other applications having a significant data-plane payload. The techniques described herein have broad applicability across any solution that can leverage SNI and/or ECH. The techniques described herein provide a mechanism for separation of control-planes and data-planes allowing for microservices to scale differently depending on role. Further, the techniques have the added benefit of providing fast-pathing of data-plane packets versus control-plane packets, along with many similar benefits in cloud-native architectures.

By way of example, and not limitation, a method according to the techniques described herein may include establishing a traffic flow in a network that is hosting an application (e.g., a cloud-native application, a microservices-based application, a VPN connection, a ZTNA connection, and/or the like), wherein control-plane traffic of the traffic flow is sent to a control-plane node associated with the application and data-plane traffic of the traffic flow is sent to a data-plane node associated with the application. In some examples, the control-plane traffic and the data-plane traffic may be sent to the control-plane node and the data-plane node, respectively, by at least one of a load balancer or a proxy server associated with a content delivery network (CDN), scalable application service platform (e.g., Kubernetes, etc.), or other cloud-delivered network that is capable of hosting the application. In some examples, the control-plane node may be a first control-plane node of multiple control-plane nodes that are associated with the application. Similarly, the data-plane node may be a first data-plane node of multiple data-plane nodes that are associated with the application. Additionally, the control-plane node may be hosted on a first server device of a CDN that is hosting the application. Similarly, the data-plane node may be hosted on a second server device of the CDN that is different from the first server device. That is, in other words, the control-plane nodes and the data-plane nodes may be running on different resources (e.g., hardware resources, virtual resources, etc.) of a datacenter or cloud-delivered network that is hosting the application.

In some examples, the method may include receiving, from a client device, a first packet including a first hostname that is associated with the application. For instance, the first packet may be received at a proxy server or a load balancer of the network. In some examples, the first hostname may be included in an extension field of a header of the first packet, such as a server name index (SNI) field or an encrypted client hello (ECH) field of the first packet. In at least one example, the first hostname may be a generic hostname associated with the application, such as "vpn.example.com."

Based at least in part on the first packet including the first hostname, the first packet may be sent to the control-plane node associated with the application. That is, in some examples, the proxy server or the load balancer may determine that, because the hostname is the generic hostname (vpn.example.com), the first packet is control-plane traffic that needs to be sent to the control-plane node. As such, the proxy server/load balancer may send the first packet to the control-plane node, even though the control-plane node may have a different hostname associated with it, such as "control.vpn.example.com."

In some examples, the control-plane node may send, to the client device, an indication of a second hostname to be used by the client device to send data-plane traffic to the data-plane node associated with the application. The control-plane node may send the indication of the second hostname to the client device based at least in part on authenticating the client device or a user of the client device to connect to the application. In other words, after authenticating the client device or the user of the client device, the control-plane node may tell the client device where to send the data-plane traffic. The second hostname may correspond with the data-plane node associated with the application, and the second hostname may be, for instance, "data.vpn.example.com."

Additionally, the method may include receiving, from the client device, a second packet including a second hostname that corresponds with the data-plane node associated with the application. For instance, the second packet may be received at the proxy server or the load balancer of the network. In some examples, the second hostname may be included in an extension field of a header of the second packet, such as an SNI field or an ECH field of the second packet.

Based at least in part on the second packet including the second hostname, the second packet may be sent to the data-plane node associated with the application. For instance, because the second packet may include the second hostname corresponding with the data-plane node (e.g., data.vpn.example.com), the proxy server/load balancer may forward the second packet to the data-plane node.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
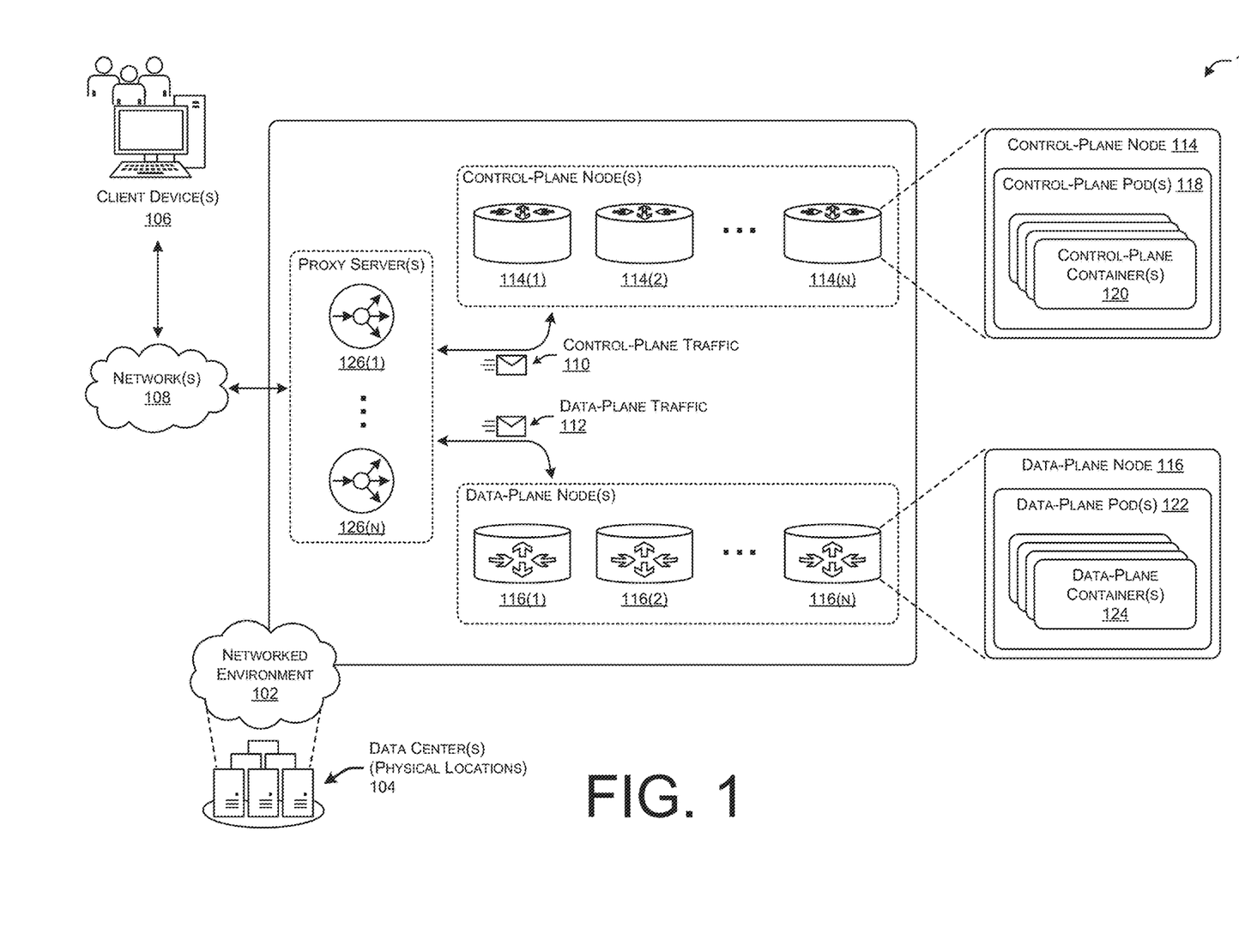
FIG. 1 illustrates a schematic view of an example architecture that may be used to perform some of the techniques described herein for using computer networking protocol extensions to segregate control-plane traffic and data-plane traffic associated with a common application.

FIG. 1 illustrates a schematic view of an example architecture 100 that may be used to perform some of the techniques described herein for using computer networking protocol extensions to segregate control-plane traffic 110 and data-plane traffic 112 associated with a common application. Generally, the networked environment 102 may include devices that are housed or located in one or more data centers 104 that may be located at different physical locations. For instance, the networked environment 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked environment 102 may not be located in explicitly defined data centers 104 and, rather, may be located in other locations or buildings. In some examples, the networked environment 102 may be a content delivery network (CDN), a scalable application service platform (e.g., an application orchestration system, such as Kubernetes), or other cloud-delivered network.

The networked environment 102 may be accessible to one or more client devices 106 over one or more networks 108. The networked environment 102, and the networks 108, may each respectively include one or more networks implemented by any viable communication technology, such as wired and/or wireless modalities and/or technologies. The networked environment 102 and networks 108 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Virtual Private Networks (VPNs), Wide Area Networks (WANs)—both centralized and/or distributed—and/or any combination, permutation, and/or aggregation thereof. The networked environment 102 and/or the networks 108 may include devices, virtual resources, or other nodes that relay packets from one network segment to another by nodes in the computer network.

In some examples, the networked environment 102 may provide, host, provide connectivity to, or otherwise support one or more services and/or applications for the client devices 106 to connect to and use. The client devices 106 may comprise any type of device configured to communicate using various communication protocols (e.g., VPN, SSL, TLS, DTLS, and/or any other protocol) over the networks 108. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

In some examples, the networked environment 102 may host the application and/or services using one or more control-plane nodes 114(1)-114(N) and one or more data-plane nodes 116(1)-116(N) (where N represents any number greater than or equal to one). The control-plane nodes 114 may handle control-plane traffic 110 (e.g., authentication, connectivity, etc.) and the data-plane nodes 116 may handle data-plane traffic 112. In some examples, each of the control-plane nodes 114(1)-114(N) may include one or more control-plane pods 118, and individual control-plane pods 118 may include one or more control-plane containers 120. Similarly, each of the data-plane nodes 116(1)-116(N) may include one or more data-plane pods 122, and individual data-plane pods 122 may include one or more data-plane containers 124.

The networked environment 102 may also include a horizontally scalable fleet of one or more proxy server nodes 126(1)-126(N) (hereinafter referred to collectively as "proxy servers 126") (where N represents any number greater than or equal to one). The proxy servers 126 may direct control-plane traffic 110 to the control-plane nodes 114 and direct data-plane traffic 112 to the data-plane nodes 116. For instance, the proxy server 126(1) may receive incoming traffic (e.g., packets) from the client device(s) 106 and determine whether the traffic is control-plane traffic 110 or data-plane traffic 112 based at least in part on inspecting an extension field (e.g., SNI field or ECH field) of the packet header. In some examples, a value included in the extension field may indicate whether the traffic is control-plane traffic 110 or data-plane traffic 112, as well as which specific node of the control-plane nodes 114 or the data-plane nodes 116 that the traffic needs to be sent to. In some examples, the extension field may include a hostname corresponding with the specific node where the traffic is to be sent. Additionally, in some instances, if multiple control-plane nodes 114 or multiple data-nodes 116 are associated with a single application or service for which traffic is to be sent to, the proxy server 126 may load balance the traffic between nodes. Although depicted in FIG. 1 as a proxy server, it is contemplated that the proxy servers 126 may be load balancers, edge routers, or other types of devices/nodes.

In some examples, the one or more proxy servers 126 may receive, from the client device 106, a first packet including a first hostname that is associated with an application or service hosted by the networked environment 102. In some examples, the first hostname may be included in an extension field of a header of the first packet, such as a server name index (SNI) field or an encrypted client hello (ECH) field of the first packet.

Based at least in part on the first packet including the first hostname, the proxy server(s) 126 may determine that the first packet is control-plane traffic 110 and send the first packet to one of the control-plane nodes (e.g., control-plane node 114(1)) that is associated with the application/service. In some examples, the control-plane node 114(1) may send, to the client device 106, an indication of a second hostname to be used by the client device 106 to send data-plane traffic 112 to a data-plane node (e.g., data-plane node 116(1)) that is associated with the application/service. The control-plane node 114(1) may send the indication of the second hostname to the client device 106 based at least in part on authenticating the client device 106 or a user of the client device 106 to connect to the application/service. In other words, after authenticating the client device 106 or the user of the client device 106, the control-plane node 114(1) may tell the client device 106 of a hostname where the data-plane traffic 112 is to be sent.

As such, the proxy server(s) 126 may receive, from the client device 106, a second packet including the second hostname that corresponds with the data-plane node 116(1) associated with the application/service. In some examples, the second hostname may be included in an extension field of a header of the second packet, such as an SNI field or an ECH field of the second packet. Based at least in part on the second packet including the second hostname, the proxy server(s) 126 may send the second packet to the data-plane node 116(1) that is associated with the application/service.

Figure 2A:
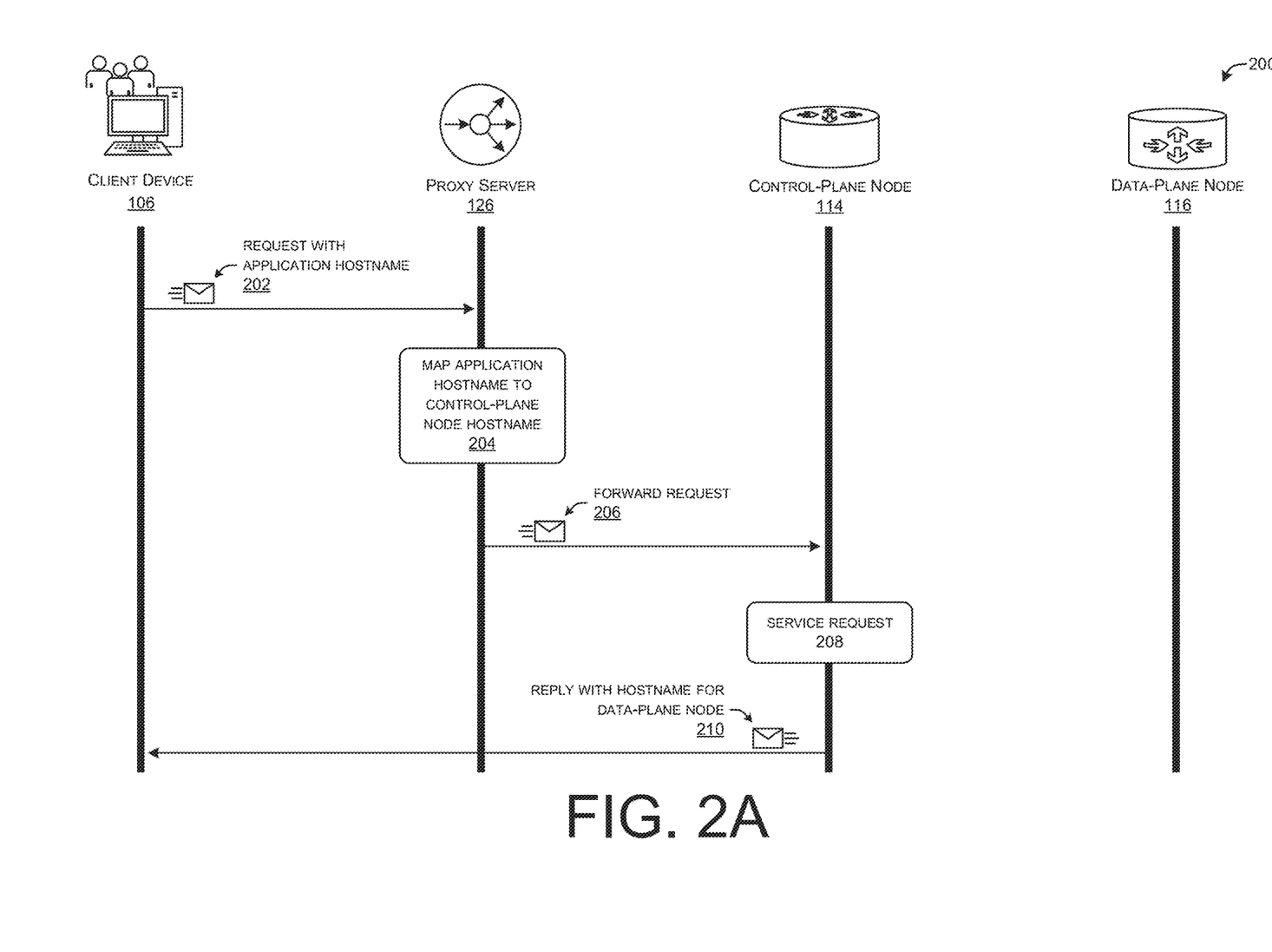
FIGS. 2A and 2B collectively illustrate a data flow diagram of an example traffic flow associated with routing control-plane traffic and data-plane traffic associated with a common application.
Figure 2B:
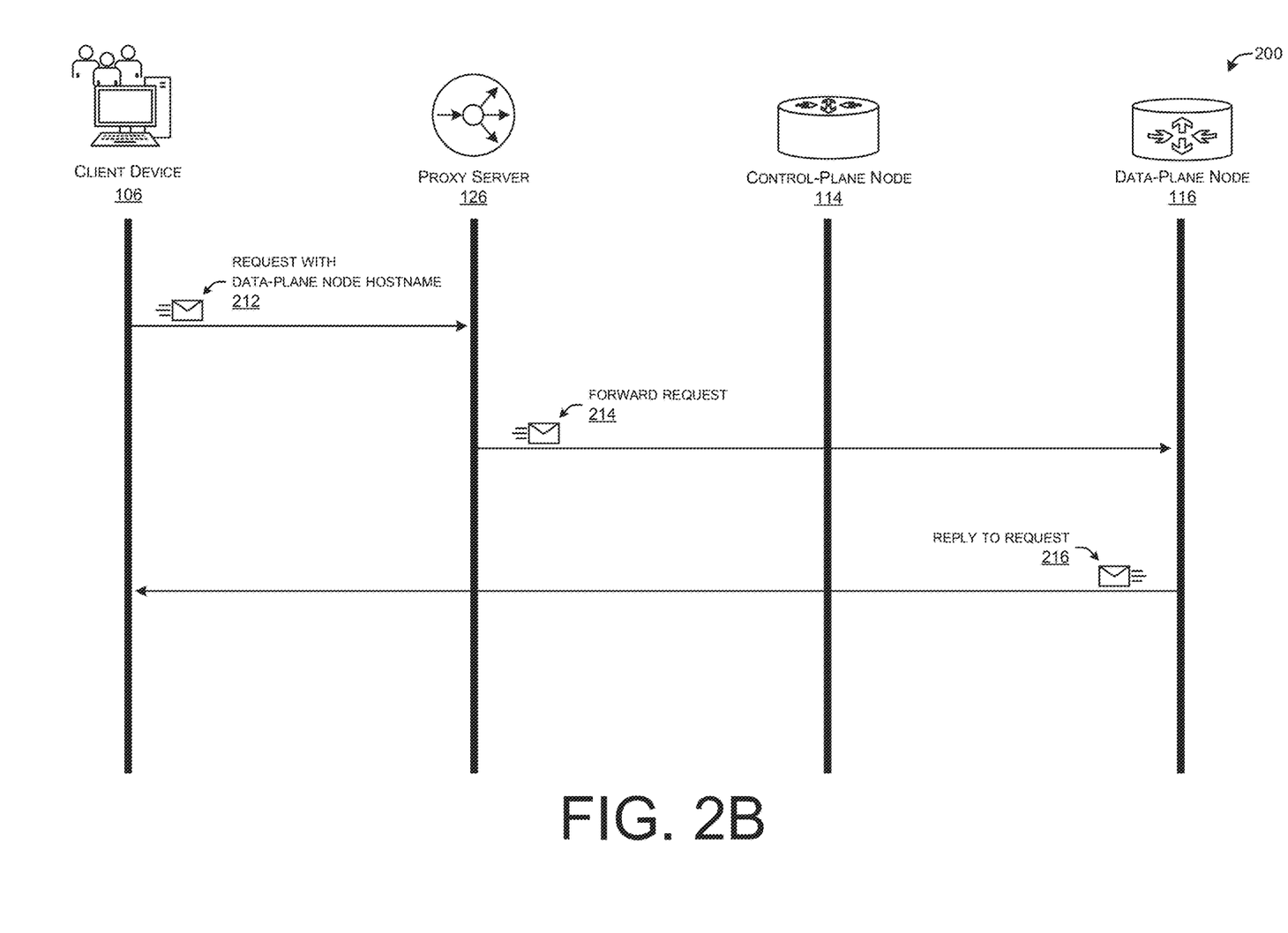

FIGS. 2A and 2B collectively illustrate a data flow diagram of an example traffic flow 200 associated with routing control-plane traffic and data-plane traffic associated with a common application. To begin, the client device 106 may, at operation 202, send a request to connect to an application or service. The request may include a hostname associated with the application that the client device 106 is trying to connect to and/or be authenticated to connect to.

The proxy server 126 may receive the request from the client device 106 and, at operation 204, the proxy server 126 may map the application hostname to a hostname of a control-plane node 114 associated with the application. In other words, because of the separate control-plane and data-plane components, the proxy server 126 may determine that the application hostname is associated with a control-plane request that needs to be mapped to the hostname of the control-plane node 114. At operation 206, the proxy server 126 may forward the request to the control-plane node 114 associated with the application.

At operation 208, the control-plane node 114 may service the request. In some examples, servicing the request may include the control-plane node authorizing or authenticating the client device 106 and/or a user of the client device 106 to connect to the application. In some examples, the client device 106 and the control-plane node 114 may perform a "handshake" operation. At operation 210, the control-plane node 114 may send, to the client device 106, a hostname for the data-plane node 116 associated with the application. That is, the control-plane node 114 may tell the client device 106 what hostname to include in an SNI or ECH field of a packet header to send traffic to the data-plane node 116. In some examples, this information may be exchanged during the handshake noted above. In some examples, in addition to the control-plane node 114 telling the client device 106 what hostname to include in an SNI or ECH field of a packet header to send traffic to the data-plane node 116, the control-plane node 114 may also tell the client device 106 what hostname to use to send traffic to the control-plane node 116 (e.g., instead of the client device 106 using the generic hostname of the application/service).

Continuing the traffic flow 200 with reference to FIG. 2B, at operation 212 the client device 106 may send a request with the data-plane node hostname. In other words, the client device 106 may send a request that includes, as part of an extension field (e.g., SNI, ECH, etc.) of the packet header, the hostname corresponding with the data-plane node 116. The proxy server 126 may receive the request and, based at least in part on the request including the hostname of the data-plane node 116, the proxy server 126 may perform operation 214 and forward the request to the data-plane node 116. At operation 216, the data-plane node 116 may reply to the request, for instance, by sending data that the client device 106 requested.

Figure 3:
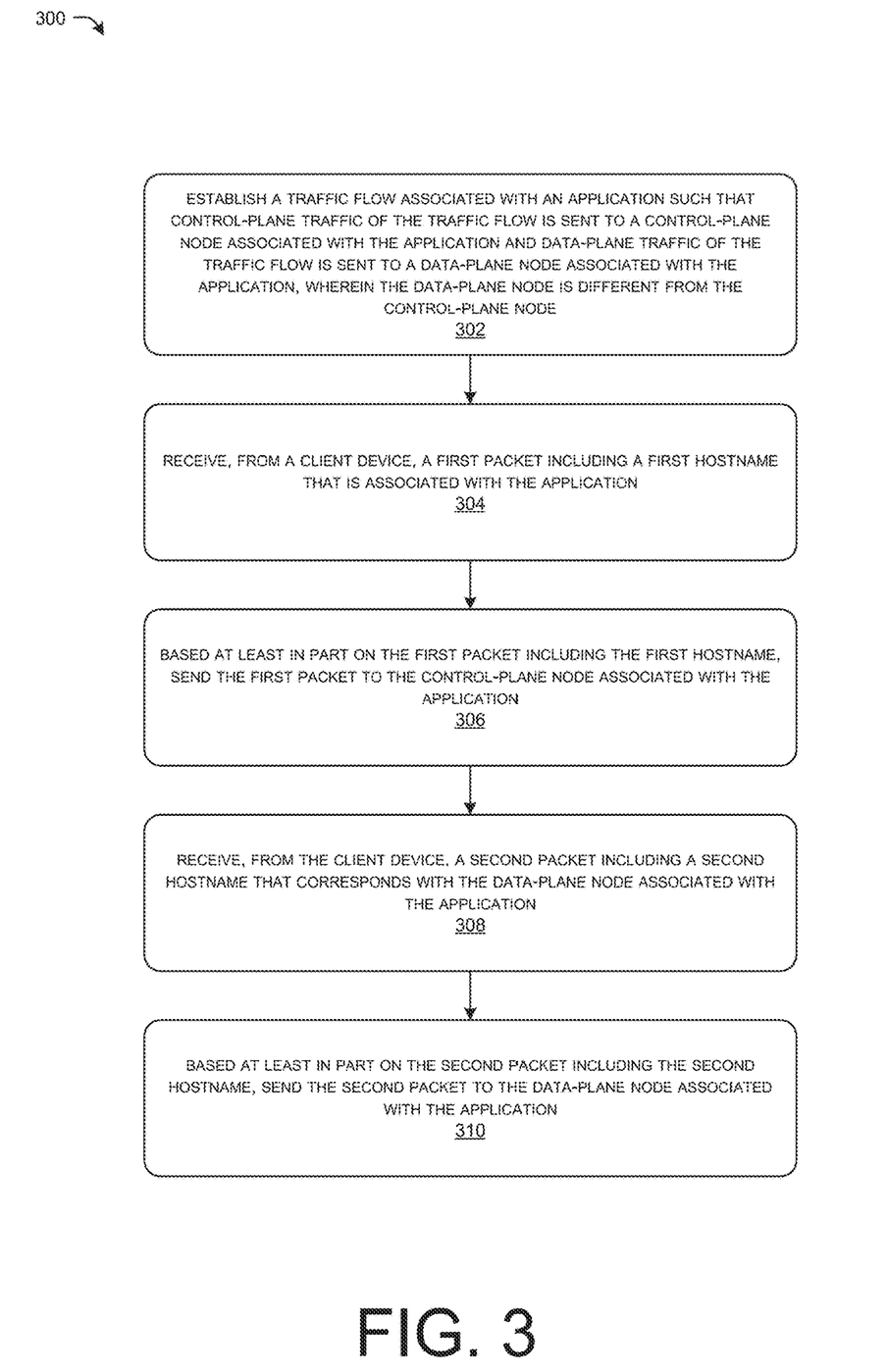
FIG. 3 is a logic flow diagram illustrating an example method for routing control-plane traffic and data-plane traffic associated with a common application.
Figure 4:
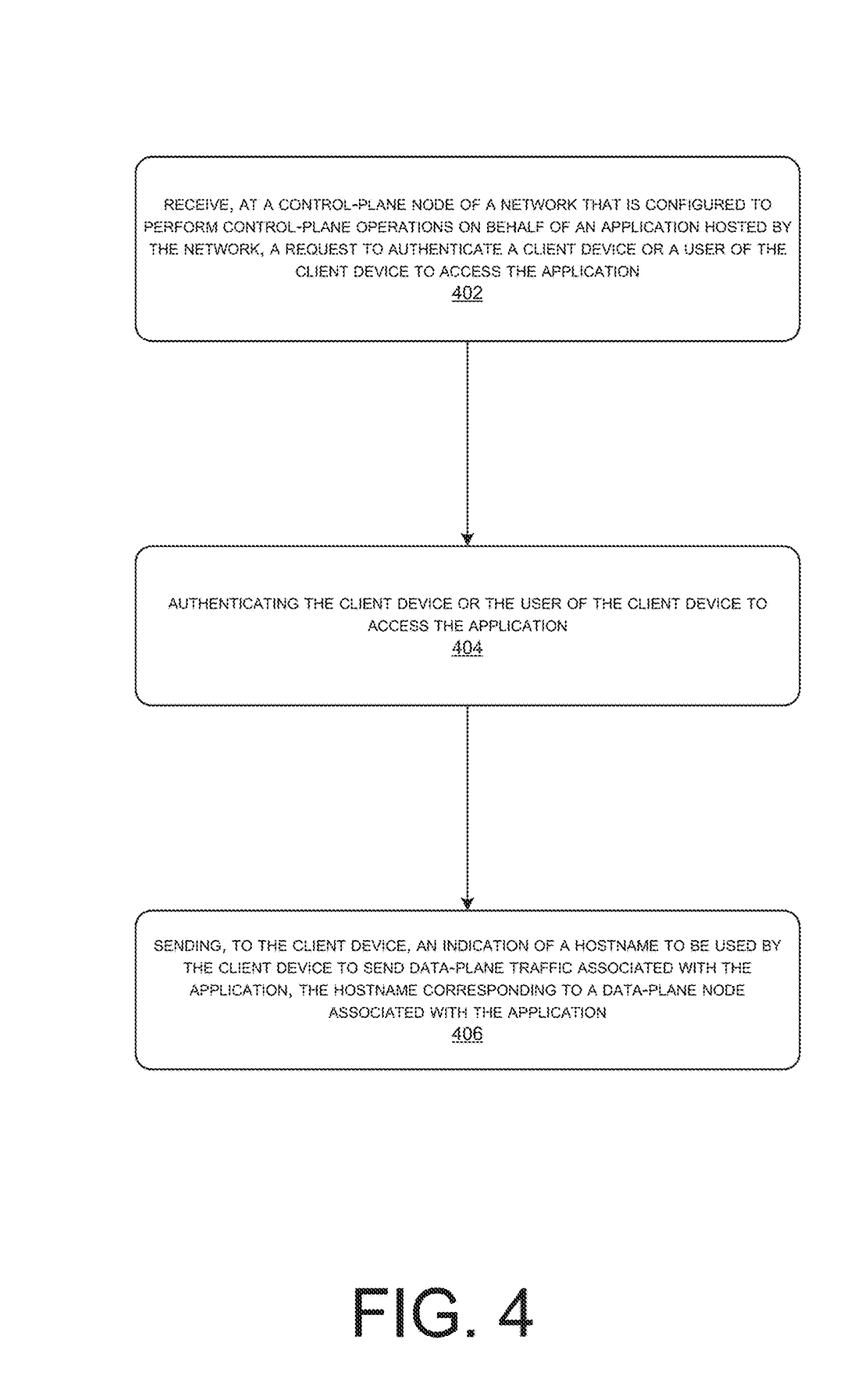
FIG. 4 is another logic flow diagram illustrating an example method associated with routing control-plane traffic and data-plane traffic associated with a common application.

FIGS. 3 and 4 are logic flow diagrams illustrating example methods 300 and 400 associated with some of the various technologies described herein. The logical operations described herein with respect to FIGS. 3 and 4 may be implemented (1) as a sequence of computer-implemented acts or program modules running on a computing system and/or (2) as interconnected machine logic circuits or circuit modules within a computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 is a logic flow diagram illustrating an example method 300 for routing control-plane traffic and data-plane traffic associated with a common application. The method 300 begins at operation 302, which includes establishing a traffic flow associated with an application such that control-plane traffic of the traffic flow is sent to a control-plane node associated with the application and data-plane traffic of the traffic flow is sent to a data-plane node associated with the application, wherein the data-plane node is different from the control-plane node. For instance, the control-plane traffic 110 of the traffic flow may be sent to the control-plane nodes 114 and the data-plane traffic 112 of the traffic flow may be sent to the data-plane nodes 116. In some examples, the control-plane traffic 110 and the data-plane traffic 112 may be sent to the control-plane nodes 114 and the data-plane nodes 116, respectively, by one of the proxy servers 126. In some examples, the control-plane node may be hosted on a first server device of a CDN that is hosting the application. Similarly, the data-plane node may be hosted on a second server device of the CDN that is different from the first server device. That is, in other words, the control-plane nodes and the data-plane nodes may be running on different resources (e.g., hardware resources, virtual resources, etc.) of a datacenter or cloud-delivered network that is hosting the application.

At operation 304, the method 300 includes receiving, from a client device, a first packet including a first hostname that is associated with the application. For instance, the proxy server 126 (or a load balancer) of the networked environment 102 may receive the first packet including the first hostname. In some examples, the first hostname may be included in an extension field of a header of the first packet, such as an SNI field or an ECH field of the first packet. In at least one example, the first hostname may be a generic hostname that is associated with the application, such as "vpn.example.com."

At operation 306, and based at least in part on the first packet including the first hostname, the method 300 may include sending the first packet to the control-plane node associated with the application. For instance, the proxy server 126 may send the first packet to the control-plane node 114(1) associated with the application. In some examples, the proxy server 126 may determine that, because the hostname is the generic hostname (vpn.example.com), the first packet is control-plane traffic 110 that needs to be sent to the control-plane nodes 114. As such, the proxy server 126 may send the first packet to the control-plane node 114(1), even though the control-plane node 114(1) may have a different hostname associated with it, such as "control.vpn.example.com."

At operation 308, the method 300 may include receiving, from the client device, a second packet including a second hostname that corresponds with the data-plane node associated with the application. For instance, the proxy server 126 of the networked environment 102 may receive the second packet from the client device 106. In some examples, the second hostname may be included in an extension field of a header of the second packet, such as an SNI field or an ECH field of the second packet. Continuing the example from above, the second hostname may be different from the first hostname and the hostname associated with the control-plane node. That is, the second hostname may be "data.vpn.example.com."

At operation 310, and based at least in part on the second packet including the second hostname, the method 300 may include sending the second packet to the data-plane node associated with the application. For instance, the proxy server 126 of the networked environment 102 may send the second packet to the data-plane node 116(1) associated with the application.

FIG. 4 is another logic flow diagram illustrating an example method 400 associated with routing control-plane traffic and data-plane traffic associated with a common application. The method 400 begins at operation 402, which includes receiving, at a control-plane node of a network that is configured to perform control-plane operations on behalf of an application hosted by the network, a request to authenticate a client device or a user of the client device to access the application. For instance, the control-plane node 114(1) of the networked environment 102 may receive the packet from the proxy server 126(1), which forwarded the packet from the client device 106

At operation 404, the method 400 may include authenticating the client device or the user of the client device to access the application. For instance, the control-plane node 114(1) may authenticate the client device 106 or the user of the client device 106 to access the application. At operation 406, the method 400 may include sending, to the client device, an indication of a hostname to be used by the client device to send data-plane traffic associated with the application, the hostname corresponding to a data-plane node associated with the application. For instance, the control-plane node 114(1) may send the indication of the hostname to the client device 106 such that the client device 106 may send the data-plane traffic 112 to one or more data-plane nodes 116 associated with the application. In some examples, the control-plane node 114(1) may send the indication of the second hostname to the client device 106 based at least in part on authenticating the client device 106 or the user of the client device 106 to connect to the application. In other words, after authenticating the client device 106 or the user of the client device 106, the control-plane node 114(1) may tell the client device 106 where to send the data-plane traffic 112. The second hostname may correspond with the data-plane node 116(1) associated with the application.

Figure 5:
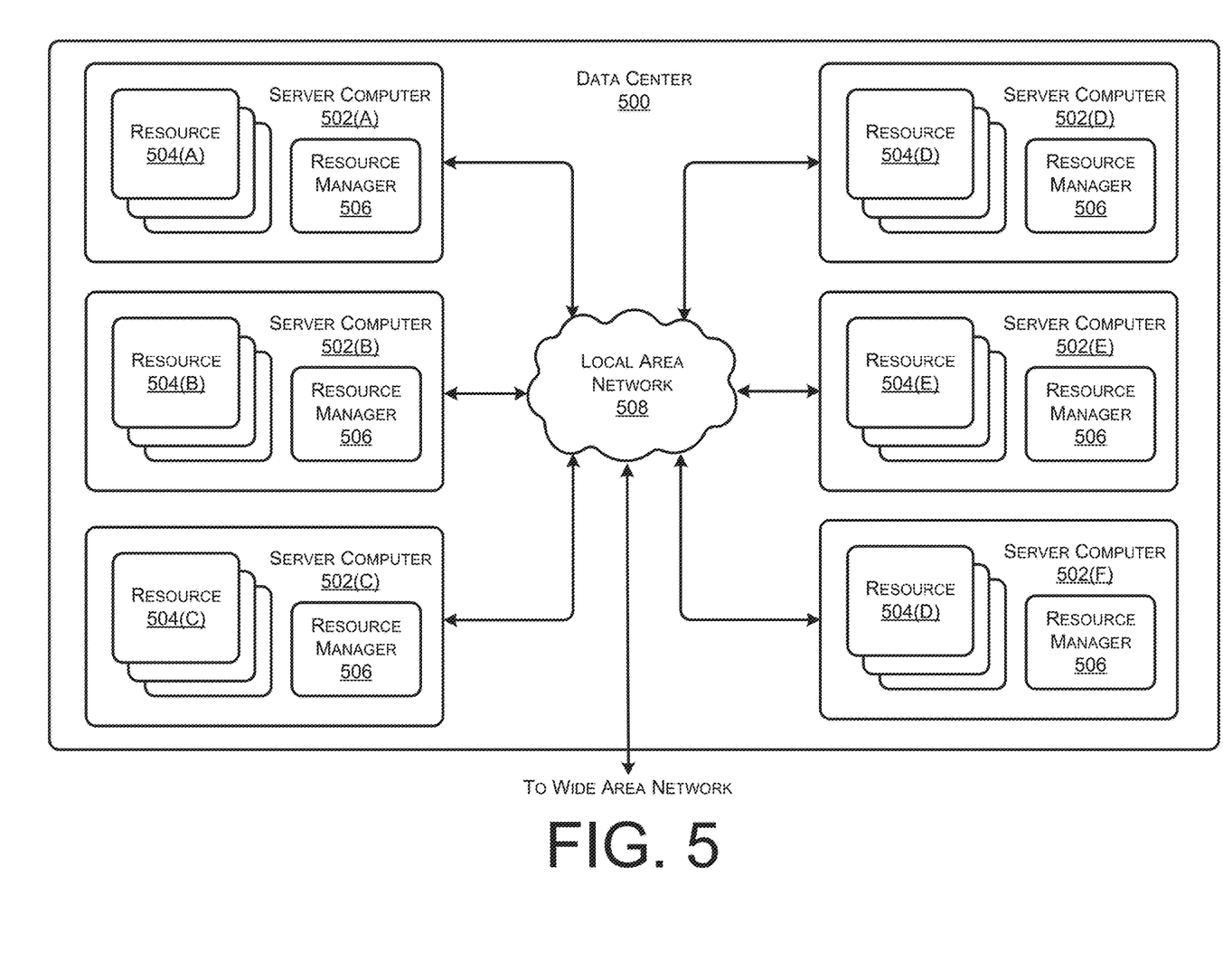
FIG. 5 is a computing system diagram illustrating an example configuration of a data center that can be utilized to implement aspects of the technologies disclosed herein.

FIG. 5 is a computing system diagram illustrating an example configuration of a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, any type of networked device or node described herein. Although described as servers, the server computers 502 may comprise any type of networked device, such as servers, switches, routers, hubs, bridges, gateways, modems, repeaters, access points, etc.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, security, packet inspection, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate local area network (LAN) 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more application containers and/or virtual machines to perform techniques described herein. In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
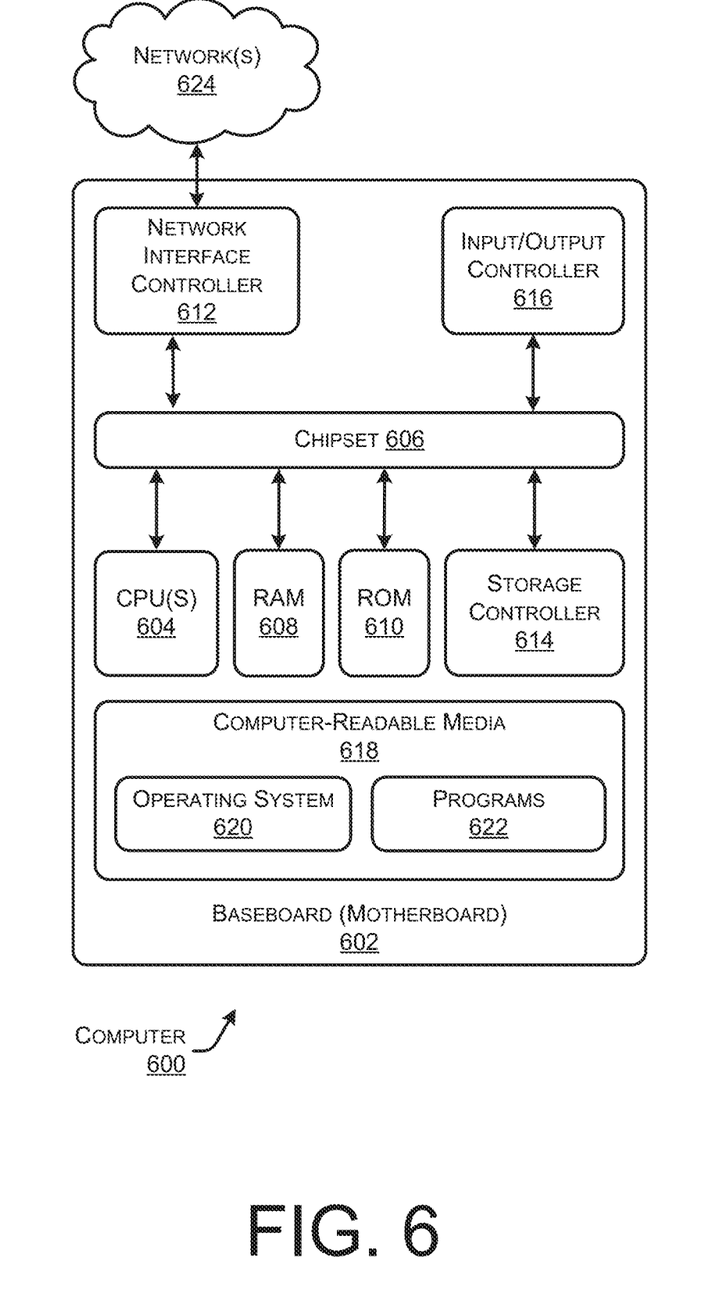
FIG. 6 illustrates a schematic view of an example computer-hardware architecture for implementing a network node and/or device, such as a proxy server, control-plane node, data-plane node, etc. that can be utilized to implement aspects of the various technologies presented herein.

FIG. 6 illustrates a schematic view of an example computer-hardware architecture for implementing a network node and/or device, such as a proxy server, control-plane node, data-plane node, etc. that can be utilized to implement aspects of the various technologies presented herein. The computer architecture shown in FIG. 6 illustrates a conventional server computer, network device, workstation, desktop computer, laptop, tablet, network appliance, e-reader, smartphone, and/or other computing device, and can be utilized to execute any of the software components presented herein. The computer 600 may comprise networked devices such as servers, switches, routers, hubs, bridges, gateways, modems, repeaters, access points, etc.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network(s) 108 and/or the network(s) 624. The chipset 606 can include functionality for providing network connectivity through a NIC 612, such as a gigabit Ethernet adapter. The NIC 612 is capable of connecting the computer 600 to other computing devices over the network. It should be appreciated that multiple NICs 612 can be present in the computer 600, connecting the computer to other types of networks and remote computer systems. In some examples, the NIC 612 may be configured to perform at least some of the techniques described herein, and may include components for performing the techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the architecture 100 and or any components included therein, may be supported by one or more devices similar to computer 600. Stated otherwise, some or all of the operations performed by the architecture 100, and or any components included therein, may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of data-plane nodes, control-plane nodes, proxy servers, and the like. The computer 600 may include one or more hardware processors 604 (processors) configured to execute one or more stored instructions. The processor(s) 604 may comprise one or more cores. Further, the computer 600 may include one or more network interfaces (e.g., NIC 612) configured to provide communications between the computer 600 and other devices over a network, such as the networks 108 and 624. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for using computer networking protocol extensions (e.g., SNI, ECH, etc.) as a mechanism for routing control-plane traffic and data-plane traffic associated with a common application.

While the invention is described with respect to the specific examples, it is to be understood that the scope of the invention is not limited to these specific examples. For instance, while many of the examples are described with respect to IPsec protocols, it should be understood that the techniques described are applicable to other protocols. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving traffic from a client device, the traffic including an identifier associated with a service hosted on a cloud-computing system, the identifier being associated with an encryption protocol;
   determining, based at least in part on the identifier, whether the traffic is control plane traffic associated with the service or data plane traffic associated with the service; and
   at least one of:
      sending the traffic to a control plane node associated with the service based at least in part on determining that the traffic is the control plane traffic, or
      sending the traffic to a data plane node associated with the service based at least in part on determining that the traffic is the data plane traffic.

2. The method of claim 1, wherein the traffic is received via a secure communication flow between the client device and the cloud-computing system.

3. The method of claim 2, wherein the secure communication flow is at least one of a Zero Trust Network Access (ZTNA) flow or a virtual private network (VPN) flow between the client device and the cloud-computing system.

4. The method of claim 1, wherein the traffic is encrypted according to an encryption protocol, the identifier included in an extension of the encryption protocol.

5. The method of claim 4, wherein the encryption protocol is at least one of Transport Layer Security (TLS) or Datagram Transport Layer Security (DTLS) and the extension is a Server Name Indication (SNI) extension.

6. The method of claim 4, wherein the encryption protocol is at least one of Transport Layer Security (TLS) or Datagram Transport Layer Security (DTLS) and the extension is an Encrypted Client Hello (ECH) extension.

7. The method of claim 4, wherein the extension of the encryption protocol is at least one of a Server Name Indication (SNI) extension or an Encrypted Client Hello (ECH) extension.

8. The method of claim 1, wherein the identifier is a first identifier indicating that the traffic is the control plane traffic, the first identifier distinguishable from a second identifier associated with the data plane traffic, and the method includes sending the traffic to the control plane node based at least in part on the first identifier.

9. The method of claim 1, wherein the identifier is a first identifier indicating that the traffic is the data plane traffic, the first identifier distinguishable from a second identifier associated with the control plane traffic, and the method includes sending the traffic to the data plane node based at least in part on the first identifier.

10. A system comprising:
   one or more processors; and
   one or more non-transitory computer-readable media storing instructions that, when executed, cause the one or more processors to perform operations comprising:
      receiving traffic from a client device, the traffic including an identifier associated with a service hosted on a cloud-computing system;

determining, based at least in part on the identifier, whether the traffic is control plane traffic associated with the service or data plane traffic associated with the service; and at least one of:
sending the traffic to a control plane node associated with the service based at least in part on determining that the traffic is the control plane traffic, or
sending the traffic to a data plane node associated with the service based at least in part on determining that the traffic is the data plane traffic.

11. The system of claim 10, wherein the traffic is received via a secure communication flow between the client device and the cloud-computing system.

12. The system of claim 11, wherein the secure communication flow is at least one of a Zero Trust Network Access (ZTNA) flow or a virtual private network (VPN) flow between the client device and the cloud-computing system.

13. The system of claim 10, wherein the traffic is encrypted according to an encryption protocol, the identifier included in an extension of the encryption protocol.

14. The system of claim 13, wherein the extension of the encryption protocol is at least one of a Server Name Indication (SNI) extension or an Encrypted Client Hello (ECH) extension.

15. The system of claim 10, wherein the identifier is a first identifier indicating that the traffic is the control plane traffic, the first identifier distinguishable from a second identifier associated with the data plane traffic, and the operations include sending the traffic to the control plane node based at least in part on the first identifier.

16. The system of claim 10, wherein the identifier is a first identifier indicating that the traffic is the data plane traffic, the first identifier distinguishable from a second identifier associated with the control plane traffic, and the operations include sending the traffic to the data plane node based at least in part on the first identifier.

17. One or more non-transitory computer-readable media storing instructions that, when executed, cause one or more processors to perform operations comprising:
receiving traffic from a client device, the traffic including an identifier associated with a service hosted on a cloud-computing system, the identifier being associated with an encryption protocol;
determining, based at least in part on the identifier, whether the traffic is control plane traffic associated with the service or data plane traffic associated with the service; and
at least one of:
sending the traffic to a control plane node associated with the service based at least in part on determining that the traffic is the control plane traffic, or
sending the traffic to a data plane node associated with the service based at least in part on determining that the traffic is the data plane traffic.

18. The one or more non-transitory computer-readable media of claim 17, wherein the traffic is received via a secure communication flow between the client device and the cloud-computing system.

19. The one or more non-transitory computer-readable media of claim 17, wherein the traffic is encrypted according to an encryption protocol, the identifier included in an extension of the encryption protocol.

20. The one or more non-transitory computer-readable media of claim 19, wherein the extension of the encryption protocol is at least one of a Server Name Indication (SNI) extension or an Encrypted Client Hello (ECH) extension.

* * * * *